(12) United States Patent
Briggs

(10) Patent No.: US 9,192,009 B2
(45) Date of Patent: Nov. 17, 2015

(54) LIGHTING APPARATUS AND METHOD FOR DETECTING REFLECTED LIGHT FROM LOCAL OBJECTS

(75) Inventor: Gerald Edward Briggs, Ottawa (CA)

(73) Assignee: ARKALUMEN INC., Ottawa (CA)

( * ) Notice: Subject to any disclaimer, the term of this patent is extended or adjusted under 35 U.S.C. 154(b) by 908 days.

(21) Appl. No.: 13/370,594

(22) Filed: Feb. 10, 2012

(65) Prior Publication Data

US 2012/0262071 A1 Oct. 18, 2012

Related U.S. Application Data

(60) Provisional application No. 61/442,698, filed on Feb. 14, 2011.

(51) Int. Cl.
*H05B 33/08* (2006.01)
*H05B 37/02* (2006.01)

(52) U.S. Cl.
CPC ........ *H05B 33/0845* (2013.01); *H05B 37/0218* (2013.01); *Y10T 307/25* (2015.04)

(58) Field of Classification Search
CPC combination set(s) only.
See application file for complete search history.

(56) References Cited

U.S. PATENT DOCUMENTS

| | | | |
|---|---|---|---|
| 4,593,234 A | 6/1986 | Yang | |
| 5,006,782 A | 4/1991 | Pelly | |
| 5,237,264 A | 8/1993 | Moseley et al. | |
| 5,248,919 A | 9/1993 | Hanna et al. | |
| 5,783,909 A | 7/1998 | Hochstein | |
| 5,803,579 A | 9/1998 | Turnbull et al. | |
| 5,932,995 A | 8/1999 | Wagoner | |
| 5,949,539 A | 9/1999 | Britton, Jr. et al. | |
| 6,069,905 A * | 5/2000 | Davis et al. | 372/50.124 |
| 6,127,798 A | 10/2000 | Lansang et al. | |
| 6,175,195 B1 | 1/2001 | Janczak et al. | |
| 6,198,230 B1 | 3/2001 | Leeb et al. | |
| 6,222,352 B1 | 4/2001 | Lenk | |
| 6,351,079 B1 | 2/2002 | Willis | |
| 6,400,482 B1 | 6/2002 | Lupton et al. | |
| 6,426,599 B1 | 7/2002 | Leeb | |
| 6,441,558 B1 | 8/2002 | Muthu | |
| 6,495,964 B1 | 12/2002 | Muthu et al. | |
| 6,504,633 B1 | 1/2003 | Hovorka et al. | |
| 6,518,561 B1 * | 2/2003 | Miura | 250/221 |
| 6,548,967 B1 | 4/2003 | Dowling et al. | |
| 6,596,977 B2 | 7/2003 | Muthu et al. | |
| 6,621,235 B2 | 9/2003 | Chang | |
| 6,794,831 B2 | 9/2004 | Leeb et al. | |
| 6,853,150 B2 | 2/2005 | Clauberg et al. | |
| 6,894,442 B1 | 5/2005 | Lim et al. | |
| 6,954,591 B2 | 10/2005 | Lupton et al. | |

(Continued)

*Primary Examiner* — Thomas J Hiltunen
(74) *Attorney, Agent, or Firm* — Murray IP Consulting Inc.; Sean Murray

(57) ABSTRACT

Lighting apparatus and method for detecting reflected light from local objects are disclosed. A controller within a lighting apparatus is used to activate and deactivate one or more LEDs within a duty cycle. The controller uses a light detection apparatus that is optically isolated from the LEDs to sample light levels during a time in which the LEDs are deactivated and during a time in which the LEDs are activated. The light level when the LEDs are deactivated is an indication of the ambient light levels within the surrounding area of the lighting apparatus. The light level when the LEDs are activated is an indication of the ambient light levels combined with any light generated by the LEDs that is reflected onto the light detection apparatus. By comparing these light levels, the controller can determine the level of light attributable to reflected light from the LEDs.

23 Claims, 12 Drawing Sheets

(56) References Cited

U.S. PATENT DOCUMENTS

| | | | |
|---|---|---|---|
| 7,016,115 B1 | 3/2006 | Leeb et al. | |
| 7,141,779 B1 | 11/2006 | Chew et al. | |
| 7,265,681 B2 | 9/2007 | Chen | |
| 7,321,203 B2 | 1/2008 | Marosek | |
| 7,352,135 B2 | 4/2008 | Shiotsu et al. | |
| 7,457,089 B2 | 11/2008 | Ohshima | |
| 7,486,032 B2 | 2/2009 | Lee | |
| 7,495,425 B2 | 2/2009 | Friedrich | |
| 7,498,754 B2 | 3/2009 | Masood | |
| 7,511,463 B2 | 3/2009 | Kumar | |
| 7,633,577 B2 | 12/2009 | Moon et al. | |
| 7,649,326 B2 | 1/2010 | Johnson et al. | |
| 7,683,470 B2 | 3/2010 | Lee et al. | |
| 7,683,504 B2 | 3/2010 | Blair et al. | |
| 7,750,616 B2 | 7/2010 | Liu | |
| 7,759,881 B1 | 7/2010 | Melanson | |
| 7,847,783 B2 | 12/2010 | Liu et al. | |
| 8,105,854 B2 | 1/2012 | Lee et al. | |
| 8,193,737 B2 | 6/2012 | Peker et al. | |
| 8,232,742 B2 | 7/2012 | Briggs | |
| 8,247,975 B2 | 8/2012 | Yoo et al. | |
| 8,248,439 B2 | 8/2012 | Ran et al. | |
| 8,324,834 B2 | 12/2012 | Wang et al. | |
| 8,358,085 B2 | 1/2013 | Catalano et al. | |
| 8,587,203 B2 | 11/2013 | Chen et al. | |
| 8,681,192 B2 * | 3/2014 | Inoue et al. | 345/690 |
| 8,766,162 B2 * | 7/2014 | Tanase | 250/214 AL |
| 8,848,202 B2 * | 9/2014 | Dyer et al. | 356/614 |
| 8,941,308 B2 * | 1/2015 | Briggs | 315/158 |
| 2004/0119602 A1 * | 6/2004 | Blum et al. | 340/815.4 |
| 2004/0263093 A1 | 12/2004 | Matsubayashi et al. | |
| 2005/0127888 A1 | 6/2005 | Marschalkowski et al. | |
| 2005/0199841 A1 * | 9/2005 | O'Maley et al. | 251/129.04 |
| 2005/0225264 A1 | 10/2005 | Kemp | |
| 2005/0269580 A1 | 12/2005 | D'Angelo | |
| 2006/0044800 A1 * | 3/2006 | Reime | 362/276 |
| 2006/0113975 A1 | 6/2006 | Mednik et al. | |
| 2006/0239689 A1 | 10/2006 | Ashdown | |
| 2007/0080911 A1 | 4/2007 | Liu et al. | |
| 2007/0103086 A1 | 5/2007 | Neudorf et al. | |
| 2007/0103832 A1 | 5/2007 | Ohshima | |
| 2007/0159421 A1 | 7/2007 | Peker et al. | |
| 2007/0182338 A1 | 8/2007 | Shteynberg et al. | |
| 2007/0195552 A1 | 8/2007 | Park | |
| 2007/0229047 A1 | 10/2007 | Sigamani et al. | |
| 2007/0268028 A1 | 11/2007 | Moyer et al. | |
| 2007/0278974 A1 | 12/2007 | Van De Ven | |
| 2008/0079705 A1 | 4/2008 | Yang et al. | |
| 2008/0088769 A1 | 4/2008 | Kim et al. | |
| 2008/0138085 A1 | 6/2008 | Lin et al. | |
| 2008/0150449 A1 | 6/2008 | Wang et al. | |
| 2008/0191642 A1 | 8/2008 | Slot et al. | |
| 2008/0224636 A1 | 9/2008 | Melanson | |
| 2008/0252664 A1 | 10/2008 | Huang et al. | |
| 2008/0272277 A1 | 11/2008 | Wei | |
| 2009/0027652 A1 * | 1/2009 | Chang et al. | 356/4.01 |
| 2009/0096392 A1 | 4/2009 | Chandran et al. | |
| 2009/0134817 A1 | 5/2009 | Jurngwirth et al. | |
| 2009/0160422 A1 | 6/2009 | Isobe et al. | |
| 2009/0167194 A1 | 7/2009 | Mizuta | |
| 2009/0174337 A1 | 7/2009 | Miskin et al. | |
| 2009/0195183 A1 | 8/2009 | Yang | |
| 2009/0251059 A1 | 10/2009 | Veltman | |
| 2009/0251071 A1 | 10/2009 | Gater et al. | |
| 2009/0322252 A1 | 12/2009 | Shiu et al. | |
| 2010/0019692 A1 | 1/2010 | Kimura | |
| 2010/0033146 A1 | 2/2010 | Irissou et al. | |
| 2010/0046210 A1 | 2/2010 | Mathai et al. | |
| 2010/0060187 A1 | 3/2010 | Newman et al. | |
| 2010/0066266 A1 | 3/2010 | Huang et al. | |
| 2010/0072899 A1 | 3/2010 | Engstrand | |
| 2010/0072902 A1 | 3/2010 | Wendt et al. | |
| 2010/0079124 A1 | 4/2010 | Melanson | |
| 2010/0100253 A1 * | 4/2010 | Fausak et al. | 700/295 |
| 2010/0102230 A1 * | 4/2010 | Chang et al. | 250/338.4 |
| 2010/0164406 A1 | 7/2010 | Kost et al. | |
| 2010/0171429 A1 | 7/2010 | Garcia et al. | |
| 2010/0171442 A1 | 7/2010 | Draper et al. | |
| 2010/0177127 A1 | 7/2010 | Akiyama et al. | |
| 2010/0194308 A1 | 8/2010 | Zhao et al. | |
| 2010/0245289 A1 * | 9/2010 | Svajda | 345/175 |
| 2010/0264834 A1 | 10/2010 | Gaines et al. | |
| 2010/0277075 A1 | 11/2010 | Rees | |
| 2010/0289424 A1 | 11/2010 | Chang et al. | |
| 2010/0302477 A1 | 12/2010 | Ohmi et al. | |
| 2010/0320936 A1 | 12/2010 | Yao | |
| 2010/0320939 A1 | 12/2010 | Lai | |
| 2011/0006691 A1 | 1/2011 | Blaha et al. | |
| 2011/0050130 A1 | 3/2011 | Rudolph | |
| 2011/0086676 A1 * | 4/2011 | Choi et al. | 455/567 |
| 2011/0101950 A1 | 5/2011 | Babb | |
| 2011/0115394 A1 | 5/2011 | Shteynberg et al. | |
| 2011/0115412 A1 | 5/2011 | Welten | |
| 2011/0187313 A1 | 8/2011 | Lee | |
| 2011/0194047 A1 | 8/2011 | Bruyneel et al. | |
| 2011/0227492 A1 | 9/2011 | Du et al. | |
| 2011/0279040 A1 | 11/2011 | Briggs et al. | |
| 2011/0279048 A1 | 11/2011 | Briggs | |
| 2011/0279053 A1 | 11/2011 | Briggs | |
| 2011/0279055 A1 | 11/2011 | Briggs | |
| 2011/0279057 A1 | 11/2011 | Briggs | |
| 2011/0298386 A1 | 12/2011 | Corradi | |
| 2012/0146519 A1 | 6/2012 | Briggs | |
| 2012/0262076 A1 | 10/2012 | Briggs | |
| 2012/0268019 A1 | 10/2012 | Briggs | |
| 2012/0312956 A1 * | 12/2012 | Chang et al. | 250/201.1 |
| 2013/0009561 A1 | 1/2013 | Briggs | |
| 2013/0015774 A1 | 1/2013 | Briggs | |
| 2013/0093343 A1 | 4/2013 | Briggs | |
| 2013/0293722 A1 * | 11/2013 | Chen | 348/164 |
| 2013/0297251 A1 * | 11/2013 | Engel-Hall et al. | 702/150 |
| 2013/0300316 A1 * | 11/2013 | Engel-Hall et al. | 315/307 |

* cited by examiner

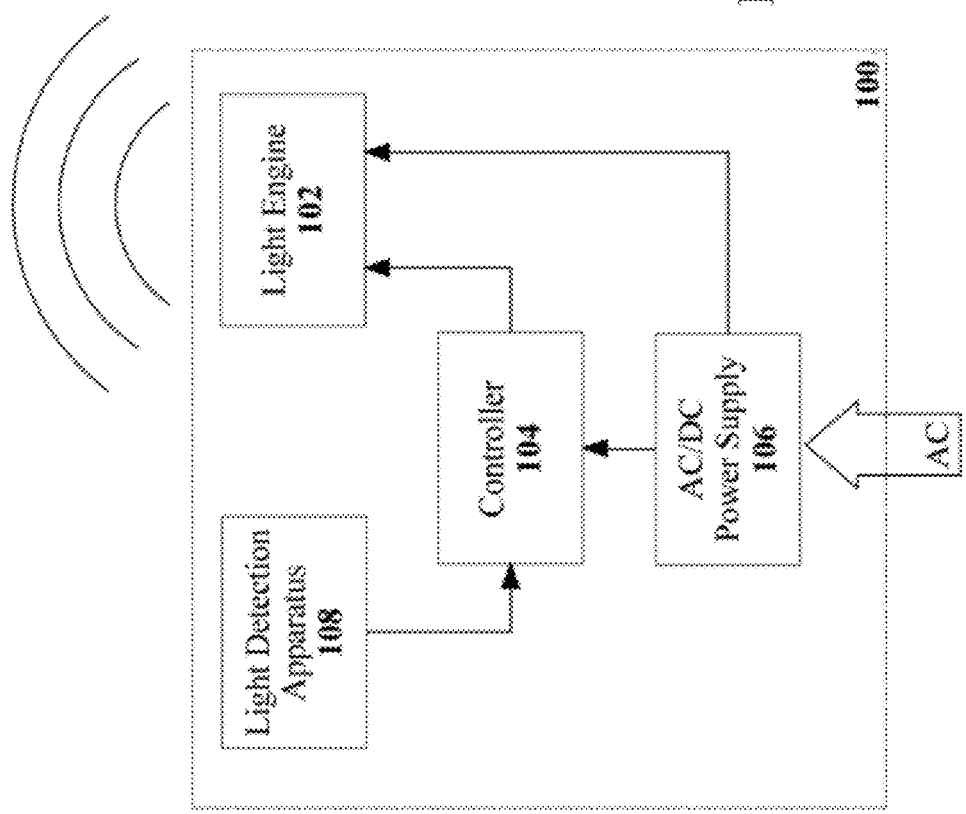

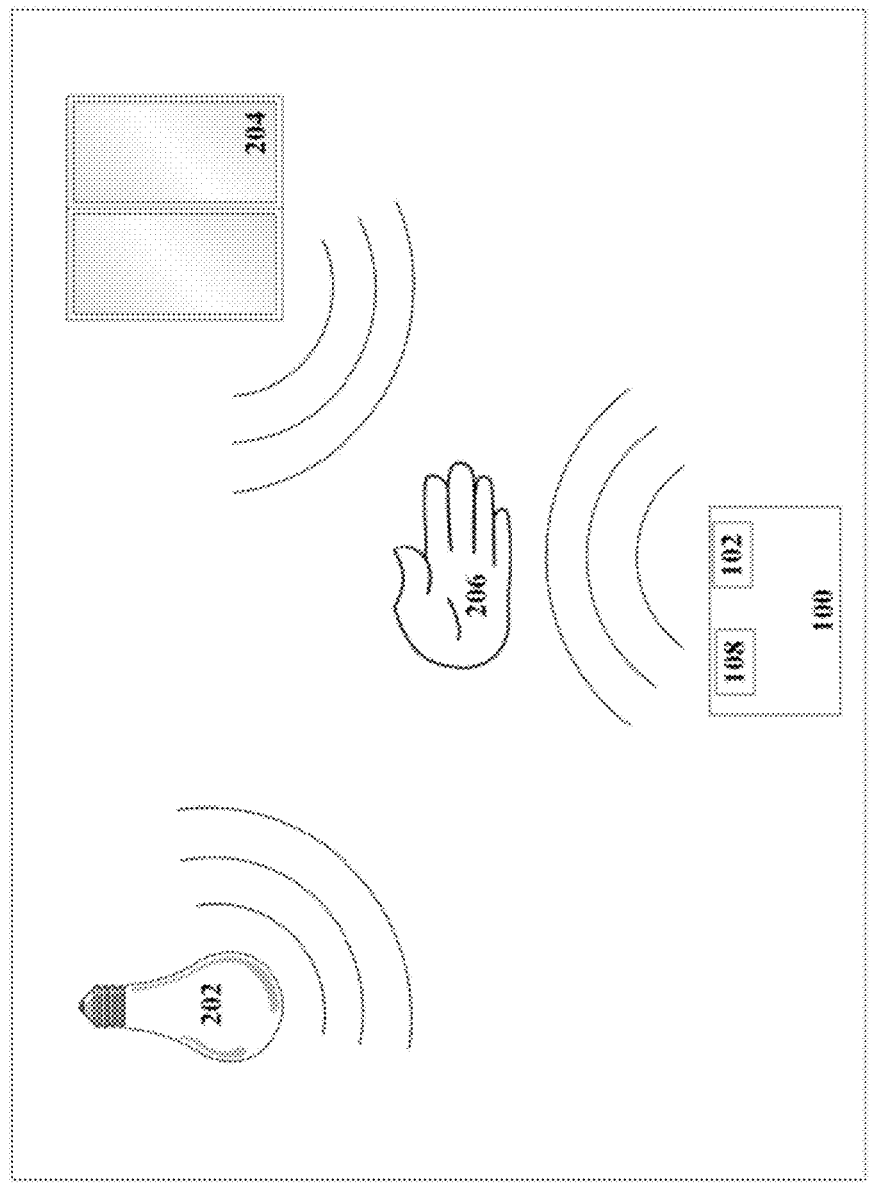

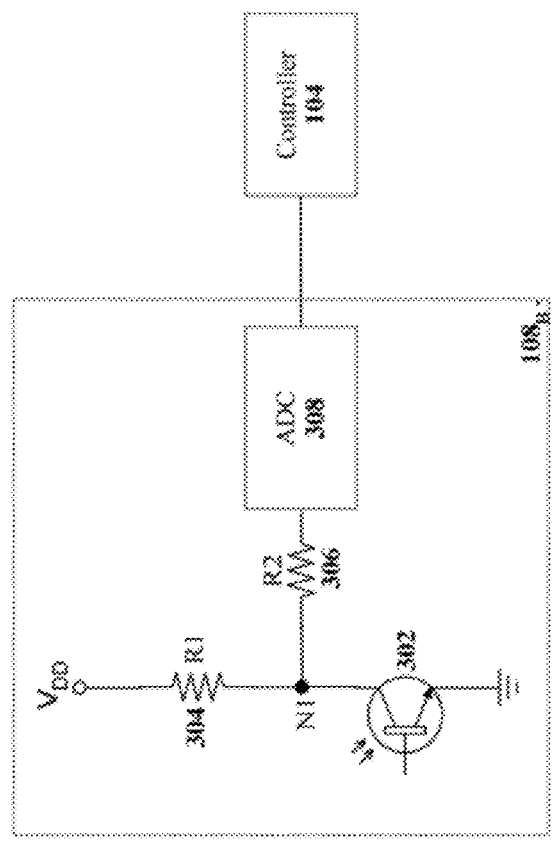
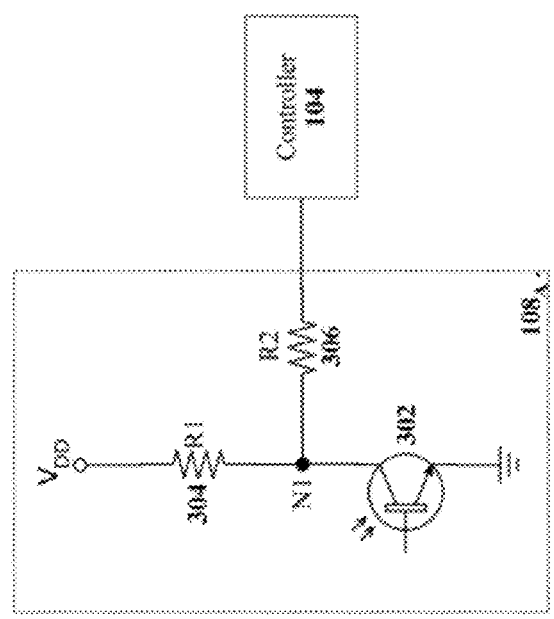
FIGURE 3B
FIGURE 3A

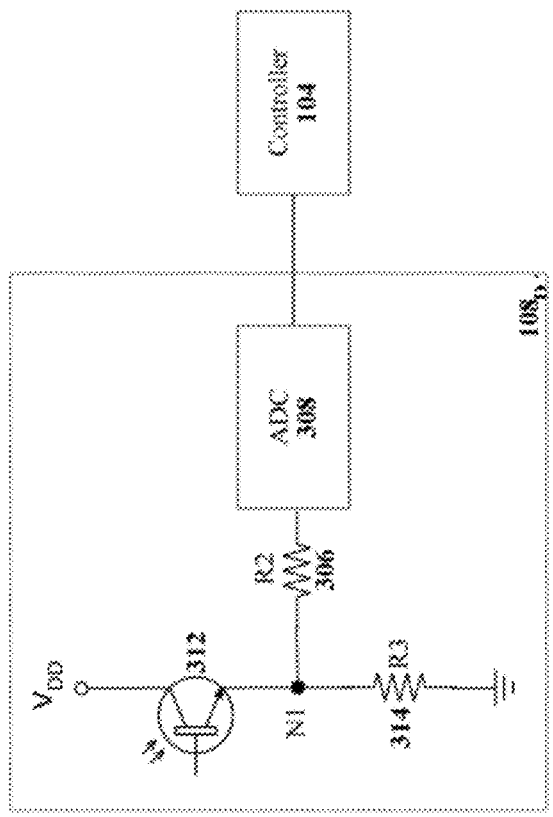
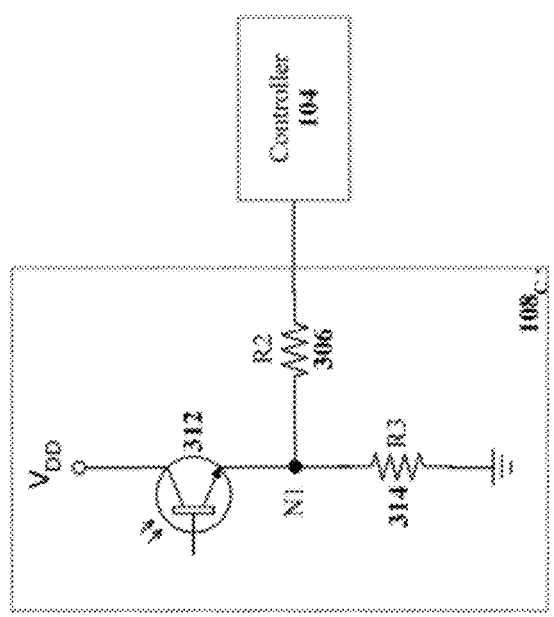

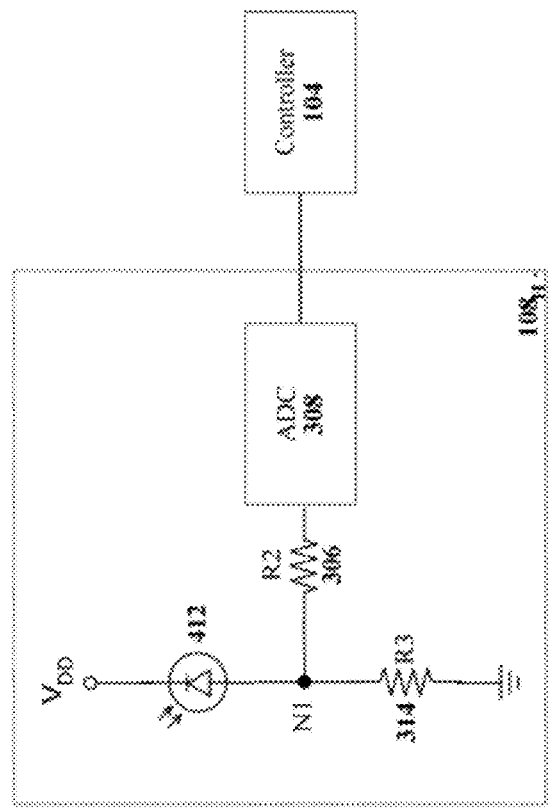
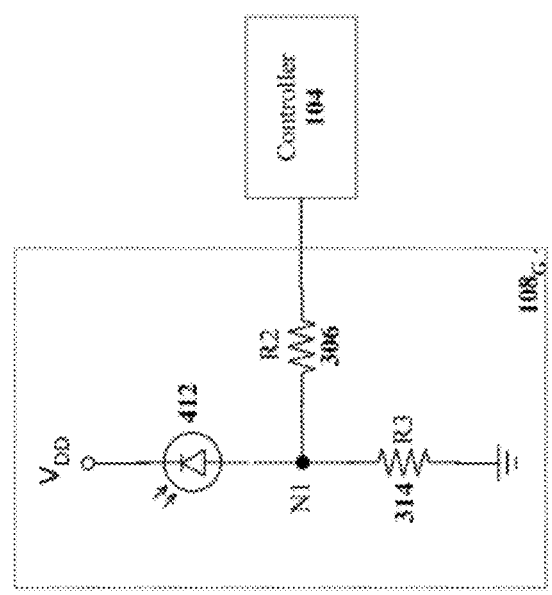
FIGURE 4D
FIGURE 4C

LIGHTING APPARATUS AND METHOD FOR DETECTING REFLECTED LIGHT FROM LOCAL OBJECTS

CROSS-REFERENCE TO RELATED APPLICATION

The present application claims the benefit under 35 USC 119(e) of U.S. Provisional Patent Application 61/442,698 filed on Feb. 14, 2011 and hereby incorporated by reference herein.

FIELD OF THE INVENTION

The invention relates generally to lighting systems and, more particularly, to lighting apparatus and method for detecting reflected light from local objects.

BACKGROUND

Light Emitting Diodes (LEDs) are increasingly being adopted as general illumination lighting sources due to their high energy efficiency and long service life relative to traditional sources of light such as incandescent, fluorescent and halogen. Each generation of LEDs are providing improvements in energy efficiency and cost per lumen, thus allowing for lighting manufacturers to produce LED light fixtures at increasingly competitive prices. One differentiator for LEDs over the traditional sources of light is their ability to be controlled very precisely relative to other lighting technologies, with the ability to switch on and off in microseconds.

User interface control systems for lights have not changed significantly in decades. The primary user interfaces for lighting fixtures are the light switch and the dimmer, typically a well-known TRIAC dimmer. In traditional lighting systems in which the only options are often on/off and luminous intensity dimming, these user interface controls may suffice. As LED lighting fixtures add more flexibility on color change and color temperature change, more advanced user interface control systems may be desired. Further, although consumers accept the status quo in which lighting user interfaces are generally uninteresting, it may be desirable to have a differentiated user interface control system for LED lighting fixtures that can take advantage of some of the physical and chemical properties of LEDs in order to capture the imagination of the public.

In general, there has been a push within many industries to implement touch free user interface controls, from voice activated telephone dialing to automatic flush toilets and faucets to lights turned on/off by clapping. The development towards touch-free solutions are being driven to increase the ability for people's hands to continue to do other tasks, to enable people to perform functions without having to touch surfaces or elements that may not be clean and/or to allow people to expend less energy while doing routine tasks. Generally, the current touch-free systems use ultrasonic, audio or infrared receivers to receive commands, detect presence and/or detect motion. Today, beyond the development of The Clapper control system (introduced to the public in 1985) and development of some infrared remote capabilities in some lighting fixtures, innovations in touch-free controls in the lighting industry have not been well developed.

Against this background, there is a need for solutions that will mitigate at least one of the above problems, particularly allowing LEDs to implement touch-free user interface control systems.

SUMMARY OF THE INVENTION

According to a first broad aspect, the invention seeks to provide a lighting apparatus comprising one or more light radiating device operable to be activated and deactivated, a light detection apparatus optically isolated from the light radiating devices and operable to sense light levels local to the lighting apparatus, and a control apparatus. The control apparatus is operable to sample a first light level using the light detection apparatus at a first time during which the light radiating devices are deactivated; to sample a second light level using the light detection apparatus at a second time during which the light radiating devices are activated; and to determine whether an object local to the lighting apparatus has caused light from the light radiating devices to reflect back to the light detection apparatus using the first and second light levels.

In some embodiments, the control apparatus is operable to control an aspect of the light radiating devices in response to determining that an object local to the lighting apparatus has caused light to reflect back to the light detection apparatus. In other embodiments, the control apparatus is operable to control an aspect of a controllable apparatus, whose primary function may be other than lighting, in response to determining that an object local to the lighting apparatus has caused light to reflect back to the light detection apparatus.

In embodiments of the present invention, the light radiating devices may comprise one or more light emitting diodes and the control apparatus may be operable to control the activation and deactivation of the light emitting diodes using pulse width modulation signals within a duty cycle.

According to a second broad aspect, the invention seeks to provide a method implemented within a lighting apparatus comprising one or more light radiating devices operable to be activated and deactivated and a light detection apparatus optically isolated from the light radiating devices and operable to sense light levels local to the lighting apparatus. The method comprises sampling a first light level using the light detection apparatus at a first time during which the light radiating devices are deactivated; sampling a second light level using the light detection apparatus at a second time during which the light radiating devices are activated; and determining whether an object local to the lighting apparatus has caused light from the light radiating devices to reflect back to the light detection apparatus using the first and second light levels.

According to a third broad aspect, the invention seeks to provide a lighting apparatus comprising one or more light radiating devices, a light detection apparatus optically isolated from the light radiating devices and operable to sense light levels local to the lighting apparatus, and a control apparatus. The control apparatus is operable to sample a first light level using the light detection apparatus at a first time during which the light radiating devices are radiating light at a first luminous intensity; to sample a second light level using the light detection apparatus at a second time during which the light radiating devices are radiating light at a second luminous intensity, the second luminous intensity being greater than the first luminous intensity; and determine whether an object local to the lighting apparatus has caused light from the light radiating devices to reflect back to the light detection apparatus using the first and second light levels.

According to a fourth broad aspect, the invention seeks to provide a method implemented within a lighting apparatus comprising one or more light radiating devices and a light detection apparatus optically isolated from the light radiating devices and operable to sense light levels local to the lighting apparatus. The method comprises sampling a first light level using the light detection apparatus at a first time during which the light radiating devices are radiating light at a first luminous intensity; sampling a second light level using the light detection apparatus at a second time during which the light radiating devices are radiating light at a second luminous intensity; and determining whether an object local to the lighting apparatus has caused light from the light radiating devices to reflect back to the light detection apparatus using the first and second light levels.

These and other aspects of the invention will become apparent to those of ordinary skill in the art upon review of the following description of certain embodiments of the invention in conjunction with the accompanying drawings.

BRIEF DESCRIPTION OF THE DRAWINGS

A detailed description of embodiments of the invention is provided herein below, by way of example only, with reference to the accompanying drawings, in which:

FIG. 1 is a logical system diagram of a lighting apparatus according to embodiments of the present invention;

FIGS. 2A and 2B are graphical illustrations of light sources within an example room in which the lighting apparatus may be located;

FIGS. 3A, 3B, 3C and 3D are circuit diagrams of a light detection apparatus according to embodiments of the present invention in which a phototransistor is utilized;

FIGS. 4A, 4B, 4C and 4D are circuit diagrams of a light detection apparatus according to embodiments of the present invention in which a photodiode is utilized;

Figure 2B:
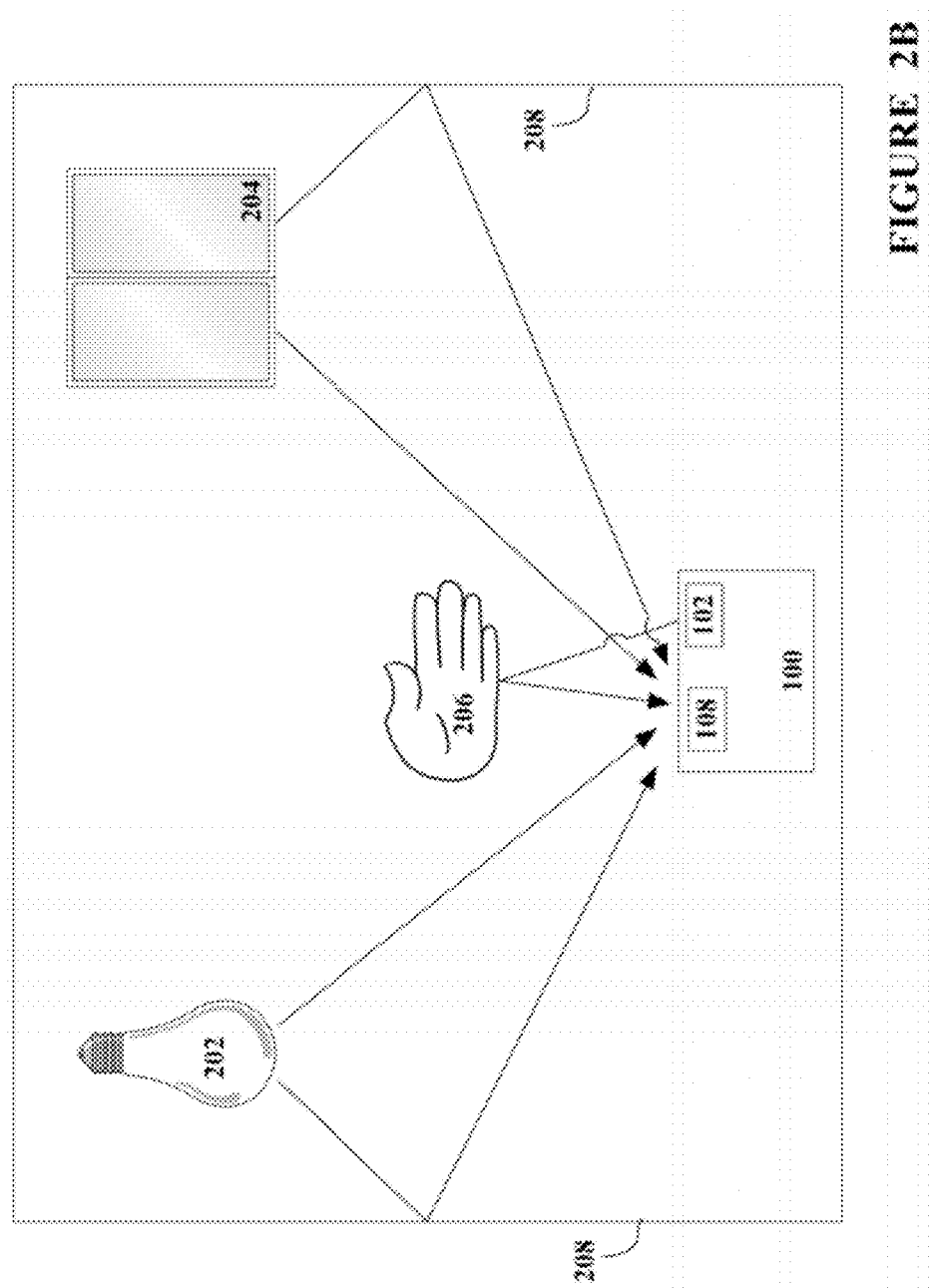
Figure 4B:
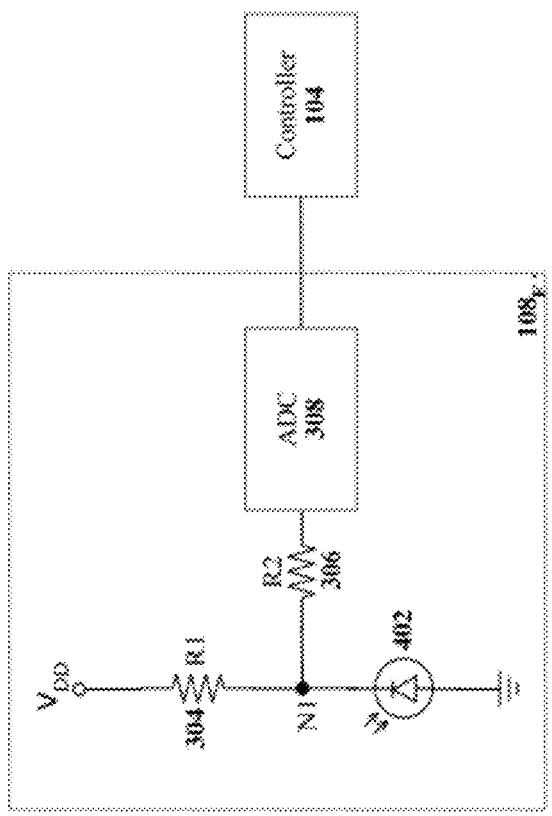
Figure 4A:
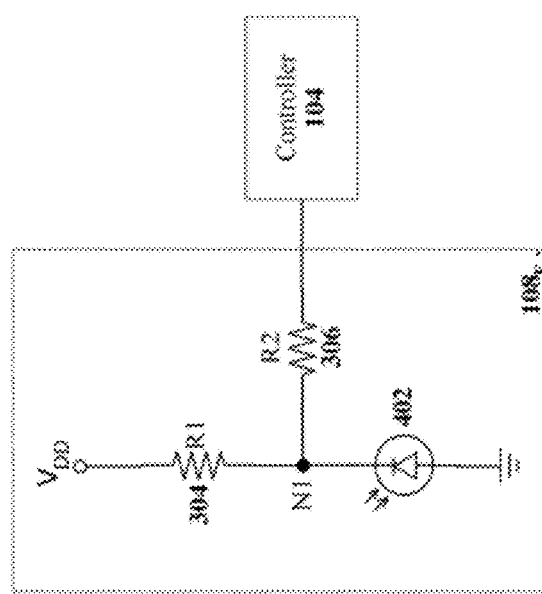
Figure 5B:
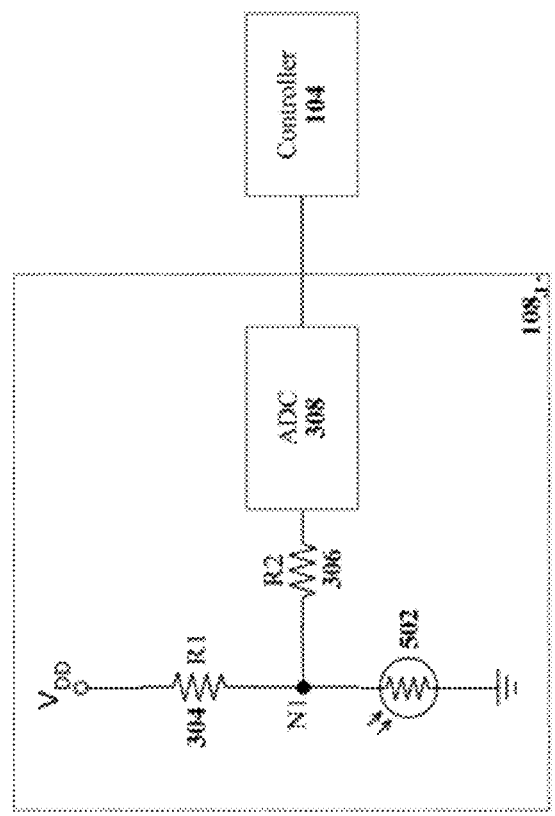
FIGS. 5A, 5B, 5C and 5D are circuit diagrams of a light detection apparatus according to embodiments of the present invention in which a photoresistor is utilized.
Figure 5A:
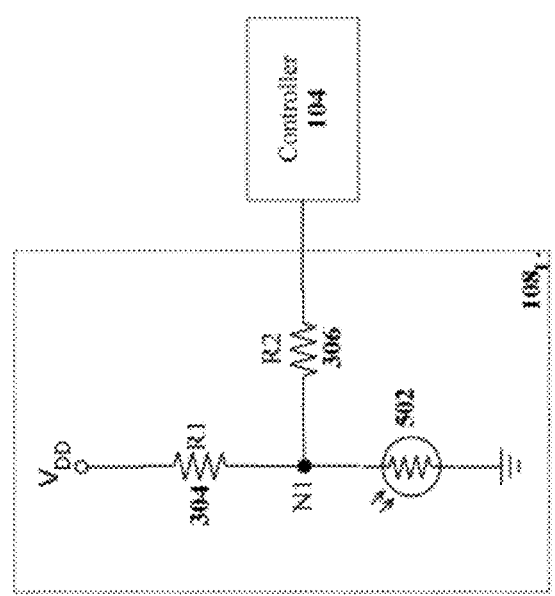
Figure 5D:
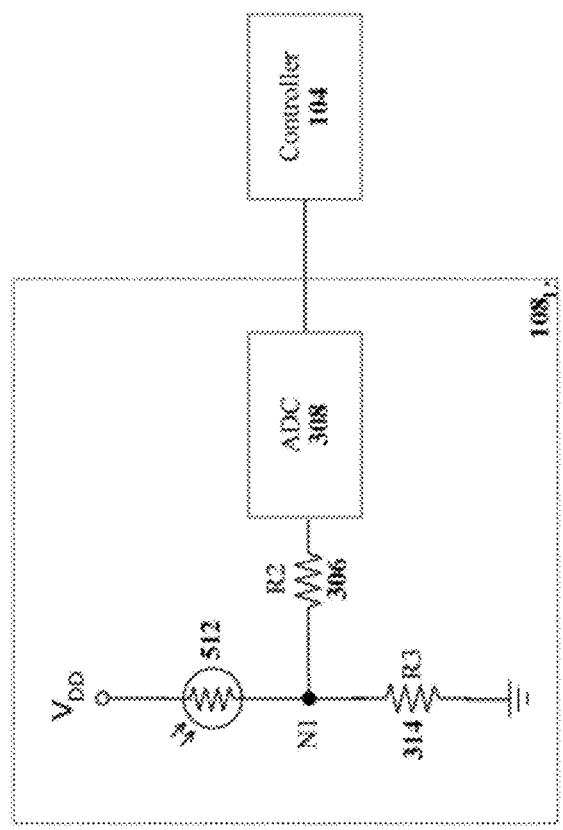
Figure 5C:
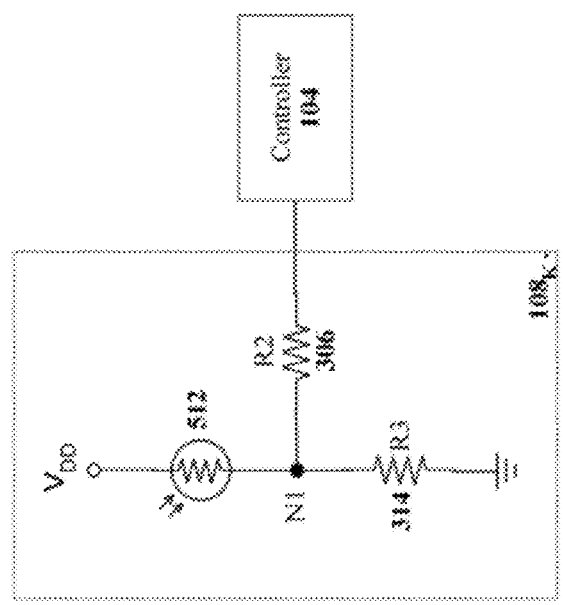

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

The present invention is directed to lighting apparatus and method for detecting reflected light from local objects. Within embodiments described below, a controller within a lighting apparatus is used to activate and deactivate one or more light radiating devices within a duty cycle. The controller uses a light detection apparatus that is optically isolated from the light radiating devices to sample light levels during a time in which the light radiating devices are deactivated and during a time in which the light radiating devices are activated. The light level when the light radiating devices are deactivated is an indication of the ambient light levels within the surrounding area of the lighting apparatus. The light level when the light radiating devices are activated is an indication of the ambient light levels combined with any light generated by the light radiating devices that is reflected onto the light detection apparatus. By comparing these light levels, the controller can determine the level of light attributable to reflected light from the light radiating devices. A high level of reflected light from the light radiating devices indicates that an object capable of reflecting light is local to the lighting apparatus.

In operation, the lighting apparatus according to embodiments of the present invention, allows a user to place an object capable of reflecting light (ex. a hand, a piece of paper, etc) local to the lighting apparatus temporarily in order to indicate a command to the controller. When the controller detects the reflected light from the object, the controller may perform one of many operations depending upon the implementation. In one embodiment, the controller may adjust an aspect of the light output from the lighting apparatus continuously as long as the controller continues to detect the reflected light from the object. The controller in one example may adjust the color of the light output from the lighting apparatus from red to blue and back until it stops detecting the reflected light from the object. In this case, the controller could then maintain the color selected by the user when the user removed the object from being local to the lighting apparatus. In other examples, the controller could adjust other aspects of the light output from the lighting apparatus such as color temperature, luminous intensity, direction and/or on/off status in response to detecting the reflected light from the object.

In other embodiments of the present invention, the controller may control a controllable apparatus coupled to or independent of the lighting apparatus in response to detecting the reflected light from the object. In some examples, the controller may control an audio radiating apparatus, such as a radio, stereo, television, telephone, MP3 player, etc. In this case, the controller may control an aspect of the audio radiating apparatus, such as the audio intensity, audio direction, audio equalization, audio balance, etc. in response to detecting the reflected light from the object. In other embodiments, the controller may control a content providing apparatus operable to provide content from at least one of a plurality of content channels, such as a television, radio, MP3 player, stereo, game console, etc. In this case, the controller may control an aspect of the content providing apparatus such as the selection of content channels, selection of content elements (ex. audio, video, game content), etc. in response to detecting the reflected light from the object. In yet other embodiments, the controller may control an apparatus operable to dispense a material, such as a water faucet, soap dispenser, paper towel dispenser etc. In this case, the controller may control an aspect of the apparatus operable to dispense a material such as the quantity of the material dispensed or the rate of the material dispensed in response to detecting the reflected light from the object. In further embodiments, the controller may control an apparatus operable to set a temperature, such as a water faucet, a thermostat, etc. In this case, the controller may control the temperature set by the apparatus in response to detecting the reflected light from the object.

Embodiments of the present invention are described below in which the light radiating devices comprise Light Emitting Diodes (LEDs). It should be understood that in some embodiments of the present invention, other light radiating devices could be utilized and the use of LEDs within the description is not meant to limit the scope of the present invention. Specifically, other light radiating devices that allow for sufficiently quick activations/deactivations may be employed. Further, light radiating devices that allow for sufficiently fast adjustments in luminous intensity levels may also be employed.

FIG. 1 is a logical system diagram of an LED lighting apparatus 100 according to embodiments of the present invention. As depicted, the LED lighting apparatus 100 comprises a number of distinct components that together enable the lighting apparatus 100 to output light. The LED lighting apparatus 100 comprises a light engine 102 which comprises a circuit with LEDs that emit light when activated, the LEDs are one example of light radiating devices; a controller 104 that outputs control signals to the light engine 102 to control the LEDs; an AC/DC power supply 106 that receives AC power from the power grid (not shown) and provides DC power to the controller 104 and the light engine 102; and a light detection apparatus 108 that can detect light levels local to the lighting apparatus 100. Other elements not shown in FIG. 1 but that may also be included within the lighting apparatus 100 include an optics element that diffuses the light output from the LEDs; a thermal element that removes heat generated by the LEDs in order to enable them to operate at an acceptable temperature; and an encasement that provides protective structure and artistic design to the lighting apparatus 100.

The light engine 102 may take many shapes, sizes and form factors. It should be understood that although depicted as a single component in FIG. 1, the light engine 102 may comprise a plurality of components. Further, all or some of the elements within the light engine 102 may be integrated within another component such as the controller 104, the thermal element (not shown) or even the encasement (not shown) or optics element (not shown).

The controller 104 in FIG. 1 manages the activation of the LEDs within the light engine 102 as will be described in detail herein below and, therefore, controls the output light spectrum and luminous intensity that is generated by the lighting apparatus 100. In the architecture depicted in FIG. 1, the controller 104 receives a constant voltage rail or a constant current source and a reference ground from the AC/DC power supply 106. The controller 104, as will be described below in detail, is operable samples light output levels using the light detection apparatus 108 and may control aspects of the light output from the light engine 102 in response. The controller 104 may further access information stored within a local memory (not shown) and internal software or firmware to generate the control signals for the light engine 102. In some embodiments of the present invention, each of the control signals transmitted by the controller 104 to the light engine 102 may comprise a pulse signal that may be in an active high state for a set time within a duty cycle.

As one skilled in the art would understand, the controller 104 can take a number of different forms including a microcontroller programmed with software, firmware, an ASIC, an FPGA, a microprocessor, logical hardware components or other components that can generate digital signals. In one particular embodiment, the controller comprises a microprocessor from Microchip Technologies Inc. of Chandler, Ariz., USA.

The AC/DC power supply 106 may comprise a large number of different power supply configurations depending upon the particular application. For instance, the AC/DC power supply 106 should be selected to match the power needs of the light engine 102 and the controller 104 and particularly to the LEDs within the light engine 102 which will utilize the majority of the power. In one example, a 24V/20 W power supply may be used in a light engine configuration that activates 7 LEDs in series at a time, each LED having a voltage drop of approximately 3.4V in this example.

The light detection apparatus 108 may be implemented in many different manners in different embodiments as will be described in detail with reference to FIGS. 3A to 3D, 4A to 4D and 5A to 5D. The light detection apparatus 108 is operable to sense light output levels local to the lighting apparatus 100 and enable the controller 104 to sample the light output local to the lighting apparatus 100 at various times in operation. According to embodiments of the present invention, the light detection apparatus 108 is at least partially optically isolated from the light engine 102 such that it does not directly sense light being transmitted by the LEDs within the light engine 102. In some embodiments, some direct light from the LEDs in the light engine 102 may be sensed by the light detection apparatus 108 or some light from the LEDs within the light engine 102 may reflect off other components within the lighting apparatus 100 (such as the optics) and be sensed by the light detection apparatus 108. In these cases, the controller 104 may need to compensate for the light from the LEDs in the light engine 102 that are systematic of the lighting apparatus design.

It should be understood that the lighting apparatus 100 of FIG. 1 is only a sample lighting architecture that could be used with the present invention and should not be used to limit the scope of the present invention. Large numbers of alternative lighting architectures are understood by one skilled in the art. For instance, the controller 104 could be integrated with any one or more of the light engine 102 and the AC/DC power supply 106. Further, additional user interface controls could be coupled to the lighting apparatus 100.

FIGS. 2A and 2B are graphical illustrations of light sources within an example room in which the lighting apparatus 100 may be located. In this graphical illustration, the lighting apparatus 100 is shown in a simplified form for clarity which only includes the light engine 102 and the light detection apparatus 108. As depicted in FIG. 2A, along with the lighting apparatus 100 in this example room, there are additional sources of light, namely a light fixture 202, shown as an incandescent bulb, and a window 204 which may allow sunlight into the room during the daytime and light from street lights, etc. at night. Also depicted within the example room of FIG. 2A is a human hand 206 that is local to the lighting apparatus 100 directly above the light engine 102 which is operable to radiate light.

FIG. 2B depicts the same example room as FIG. 2A and illustrates a number of potential paths for light that may be sensed at the light detection apparatus 108. As shown, each of the light fixture 202 and the window 204 may radiate light that is sensed directly by the light detection apparatus. Further, light radiated from the light fixture 202 and the window 204 may reflect off objects in the room capable of reflecting light. In FIG. 2B, it is illustrated that light radiated off walls 208 of the room may be sensed by the light detection apparatus 208. Further, as illustrated, light that is radiated by the light engine 102 may reflect off the hand 206 and be sensed by the light detection apparatus 108. The detection of light radiated by the light engine 102 and reflected off the hand 206 would only occur when the light engine 102 is active and would cease when the light engine 102 is not active. Although not depicted in FIG. 2B, light radiated from the light engine 102 may also reflect off other objects in the room such as the walls 208, though depending upon the distance to the other objects, such as the walls 208, the reflect light from the light engine 102 that has reflected off the walls 208 may be relatively low and not significant in comparison to the other sources of light 202, 204 and the reflected light of the light engine 102 from the hand 206.

In embodiments of the present invention, the controller 104 (not shown in FIG. 2B for simplicity) samples the light level local to the lighting apparatus 100 using the light detection apparatus 108 at two or more times in order to determine whether an object local to the lighting apparatus 100 has caused light from the light engine 102 to reflect back to the light detection apparatus 108. In one embodiment, the controller 104 controls the light engine 102 to deactivate the LEDs and takes a sample at a first time and controls the light engine 102 to activate the LEDs and takes a sample at a second time. One can approximate the light level sensed at the light detection apparatus 108 at the first time in the example of FIG. 2B as:

$$I_V(t_1) = I_{A1} + I_{A2} + I_{A3} + I_N$$

where: $I_V(t_1)$ is the light level sensed at the light detection apparatus 108 at the first time; $I_{A1}$ and $I_{A2}$ are the light levels sensed at the light detection apparatus 108 due to direct light from the light fixture 202 and the window 204 respectively; $I_{A3}$ is the light level sensed at the light detection apparatus 108 due to reflected light from the light fixture 202 and the window 204; $I_N$ is a level of noise sensed at the light detection apparatus 108. The combination of $I_{A1}$, $I_{A2}$ and $I_{A3}$ can together be considered the ambient light level. One can approximate the light level sensed at the light detection apparatus 108 in the example of FIG. 2B at the second time as:

$$I_V(t_2) = I_R + I_{A1} + I_{A2} + I_{A3} + I_N$$

where: $I_V(t_2)$ is the light level sensed at the light detection apparatus 108 at the second time; and $I_R$ is the light level sensed at the light detection apparatus 108 caused by light radiated by the light engine 102 being reflected onto the light detection apparatus 108 by one or more objects (such as the hand 206) within the room.

The controller 104 can use these sampled light levels to determine whether there is significant light being reflected from the light engine 102 to the light detection apparatus 108, which would lead to an assumption that there is an object capable of reflecting light local to the light apparatus 100. In embodiments of the present invention, the light detection apparatus 108 is optically isolated from the light engine 102 such that substantially no direct light is radiated by the light engine 102 to the light detection apparatus 108. Therefore, if the light level sensed by the light detection apparatus 108 when the light engine 102 is activated is significantly greater than the light level sensed when the light engine 102 is deactivated, it is clear that a significant amount of light is being reflected from the light engine 102 off of an object to the light detection apparatus 108.

The controller 104, according to one embodiment, may calculate a difference between the two sampled light levels. If the light detection apparatus 108 is perfectly optically isolated from the light engine 102, the difference could be an approximation of the light level of the reflected light $I_R$. If the light detection apparatus 108 is not perfectly optically isolated from the light engine 102, the difference could be a sum of the light level of the reflected light $I_R$ combined with the light level of light directly sensed from the light engine 102. If the light detection apparatus 108 is poorly optically isolated from the light engine 102, then the resulting difference may be dominated by light sensed directly from the light engine 102 and therefore the controller may have more difficulty distinguishing changes in the sampled light levels due to the light level of the reflected light $I_R$.

Upon calculating the difference, the controller 104 can compare the resulting value to a predetermined limit. The predetermined limit can be set in many ways. In one embodiment, the predetermined limit is set to a level statistically significant above potential noise levels. In this case, if the difference between the first and second sampled light levels is above the predetermined limit, then it can be concluded that the level of the reflected light $I_R$ is statistically significant and not simply a random noise affect. In some embodiments in which the light detection apparatus 108 is not perfectly optically isolated from the light engine 102, the predetermined limit may include an expected light level caused by the direct light from the light engine 102. In this case, the difference between the first and second sampled light levels would be compared to an expected light level if there were no significant reflected light $I_R$. If the difference is greater than the predetermined limit, then it can be concluded that there is statically significant levels of reflected light $I_R$.

In some environments, naturally occurring reflections of light from the light engine 102 may occur due to permanent or semi-permanent objects (ex. walls, furniture, etc.) which could affect the detection of a temporary object capable of reflecting light. For example, if the lighting apparatus 100 is adjacent to a white wall, the white wall may always reflect light from the light engine 102 when the light engine 102 is activated. In some embodiments, to compensate for the environmental issues, a calibration stage is performed to set the predetermined limit and/or adjust the predetermined limit if the environment changes. In one example implementation, upon initial power up, the controller 104 may assume that only permanent and/or semi-permanent objects (ex. walls, furniture, etc.) will cause light from the light engine 102 to reflect on the light detection apparatus 108. By sampling the first and second light outputs within a set time period after initial power-up, the controller 104 can calculate the difference naturally occurring within the environment of the lighting apparatus 100 and store that value or a value statistically higher than the value as the predetermined limit To compensate for changes in the environment surrounding the lighting apparatus 100, the controller 104 may adjust the predetermined limit in response to the difference between the first and second sampled light levels being consistent for more than a predetermined time period, for example one minute.

In alternative embodiments, the controller 104 may not calculate the difference between the first and second sampled light outputs but instead calculate the ratio between the first and second sampled light outputs or perform another operation that allows the controller 104 to compare the values. The controller 104 utilizes the comparison of the first and second sampled light outputs to determine whether there is reflected light $I_R$ from the light engine 102 being sensed at the light detection apparatus 108 and, therefore, an assumption of whether there is an object capable of reflecting light local to the lighting apparatus 100. In some cases as discussed, the controller 104 may compensate for semi-permanent objects that are local to the lighting apparatus 100 by increasing the threshold by which the calculated reflected light $I_R$ must be in order for the controller to determine that a temporary object is local to the lighting apparatus 100.

Although the above embodiments are described for implementations in which the controller 104 fully activates and deactivates the light engine 102, in some embodiments, the controller may not fully activate or fully deactivate the light engine 102 when sampling the light levels. For example, if the light engine 102 comprises a plurality of strings of LEDs, the controller 104 may sample the light level using the light detection apparatus 108 during a first time in which a first number of strings of LEDs are activated and sample the light level during a second time in which a second number of strings of LEDs are activated, the first number being less than the second number. Further, in an alternative embodiment in which the current flowing through the LEDs in the light engine 102 can be dynamically controlled by the controller 104 such that the light engine 102 can be dimmed through instantaneous current control, the controller 104 may sample the light level using the light detection apparatus 108 at a first time in which the LEDs within the light engine 102 are operated at a first current level and sample the light level at a second time in which the LEDs within the light engine 102 are operated at a second current level, the first current level being less than the second current level.

In these implementations, the light engine 102 is radiating light at a first luminosity when the controller 104 samples the first light level using the light detection apparatus 108 and is radiating light at a second luminosity, higher than the first luminosity, when the controller 104 samples the second light level using the light detection apparatus 108. One can approximate the light level sensed at the light detection apparatus 108 at the first time in this example implementation as:

$$I_P(t_1) = I_{A1} + I_{A2} + I_{A3} + I_R(t_1) + I_N$$

where: $I_R(t_1)$ is the light level sensed at the light detection apparatus 108 caused by light radiated by the light engine 102 being reflected onto the light detection apparatus 108 by one or more objects (such as the hand 206) within the room at the first time when the controller 104 samples the light level. One can approximate the light level sensed at the light detection apparatus 108 at the second time in this example implementation as:

$$I_P(t_2) = I_R + I_{A1} + I_{A2} + I_{A3} + I_R(t_2) + I_N$$

where: $I_R(t_1)$ is the light level sensed at the light detection apparatus 108 caused by light radiated by the light engine 102 being reflected onto the light detection apparatus 108 by one or more objects (such as the hand 206) within the room at the second time when the controller 104 samples the light level.

In this implementation in which the light engine 102 is radiating light during both the first and second time that the controller 104 samples the light level, if no object capable of reflecting light is sufficiently local to the lighting apparatus 100 to reflect the light being radiated from the light engine 102 to the light detection apparatus 108, both $I_R(t_1)$ and $I_R(t_2)$ would be close to zero. In this case, the difference between the two sampled light levels made by the controller 104 would not be significant. If then compared to a predetermined limit, the controller 104 would determine that there is no object capable of reflecting light sufficiently local to the lighting apparatus 100. If an object capable of reflecting light is sufficiently local to the lighting apparatus 100 to reflect the light being radiated from the light engine 102 to the light detection apparatus 108, both $I_R(t_1)$ and $I_R(t_2)$ may be significant values. The controller 104 can calculate the difference between $I_P(t_1)$ and $I_P(t_2)$ in order to determine an approximation of the difference between $I_R(t_1)$ and $I_R(t_2)$, which in this case would be a significant value if the difference between the light levels radiated by the light engine 102 at the first and second times was significant. The controller 104 can once again compare the resulting difference with a predetermined limit and, if the difference is great than the predetermined limit, the controller 104 can determine that there is an object capable of reflecting light local to the lighting apparatus 100. Similar to the above description, the predetermined limit may be adjusted in different implementations a) to compensate for imperfect optical isolation between the light detection apparatus 108 and the light engine 102 and/or b) to compensate for environmental issues such as permanent or semi-permanent objects capable of reflecting light being local to the lighting apparatus 100.

Although objects are described as "capable of reflecting light", it should be understood that there are a number of aspects of the object that affect the ability at which the object is capable of reflecting light from the light engine 102 to the light detection apparatus 108. These aspects include: the size of the object, the color of the object, the reflective/diffusive properties of the material that the object is made of, the angle of the object relative to the light engine 102 and light detection apparatus 108, and the distance of the object from the lighting apparatus 100. In particular, generally an object that is larger, whiter, more reflective, at a proper angle to the light engine 102 and the light detection apparatus 108 and/or close to the lighting apparatus 100 will reflect light from the light engine 102 to the light detection apparatus better than an object that is smaller, darker, more diffusive, at a poor angle to the light engine 102 and the light detection apparatus 108 and/or farther from the lighting apparatus 100. In fact, in embodiments of the present invention, the controller 104 may not determine that an object capable of reflecting light is local to the lighting apparatus 100 if the object does not reflect sufficient light due to its size, color, reflective/diffusive properties, angle to the light engine 102 and the light detection apparatus 108 and/or the distance.

In one alternative embodiment of the present invention, the controller 104 may be operable to determine a relative level of reflection of an object, which may be linked to the distance of the object to the lighting apparatus 100. Presuming the size, color, reflectivity and angle are sufficient to reflect light from the light engine 102 to the light detection apparatus 108, the distance from the lighting apparatus 100 will be the primary factor in an increase or decrease in the light level $I_R$ sensed at the light detection apparatus 108 caused by light radiated by the light engine 102 being reflected onto the light detection apparatus 108 by the object. The controller 104 may, as previously described, sample two light levels at two different times during which the light engine 102 is activated and deactivated respectively or the light engine 102 is radiating light at a first light level and a second higher light level respectively. In order to determine the relative level of reflection of an object, and therefore potentially the distance of the object to the lighting apparatus 100, the controller 104 may determine the difference between the two sampled light levels and compare this resulting value to a plurality of predetermined limits By comparing to a plurality of predetermined limits, the controller 104 can classify the level of reflection caused by the object. If the primary cause of a reduction in the sensed reflected light at the light detection apparatus 108 is the diffusion of light caused by distance between the object and the lighting apparatus 100, then the controller 104 can determine a relative distance between the object and the lighting apparatus 100 by determining how the difference in the two sampled light levels compares to the plurality of predetermined limits.

The design of the light detection apparatus 108 may be done in many different manners. FIGS. 3A to 3D, 4A to 4D and 5A to 5D illustrate twelve various implementations for the light detection apparatus 108, though it should be understood that numerous other designs are possible that could allow the controller 104 to sample a light level at the lighting apparatus 100. The design of the light detection apparatus 108 should not limit the scope of the present invention.

FIGS. 3A, 3B, 3C and 3D are circuit diagrams of the light detection apparatus 108 according to specific embodiments of the present invention in which a phototransistor 302 is utilized. As shown in FIG. 3A, a light detection apparatus $108_A$ comprises a phototransistor 302 coupled between a reference ground and a node N1 while a resistor 304 with a value of R1 is coupled between a supply voltage $V_{DD}$ and the node N1. The node N1 is further coupled to the controller 104 via an isolation resistor 306 with a value of R2. The phototransistor 302 has a dynamic resistance $R_{CE}$ across its collector/emitter that is high if no light is detected (ex. 1 MΩ in one example) and goes lower as the phototransistor detects light (ex. 1 kΩ in intense light in one example). The phototransistor 302 has a relatively stable capacitance $C_{CE}$ across its collector/emitter. The voltage $V_1$ at node N1 is determined based on the voltage divider between resistor 304 and the resistance of the phototransistor 302: $V_1 = R_{CE}/(R1+R_{CE}) \times V_{DD}$.

In some embodiments of the present invention, the resistance R1 is selected to be small (ex. 50Ω in one example) in order to ensure a relatively fast response (for example ~10 µs) when the phototransistor 302 senses a change in light level. With a small value for resistance R1, the voltage $V_1$ is very close to the supply voltage $V_{DD}$ and adjusts only slightly based upon the change of resistance across the phototransistor 302 as light is sensed. For example, in one implementation, the voltage $V_1$ may range from $-0.999 \times V_{DD}$ to $-0.990 \times V_{DD}$. In the embodiment of FIG. 3A, the controller 104 comprises an analog to digital convertor (ADC) which is coupled to the node N1 through the isolation resistor 306 and can convert a voltage at its connection to the light detection apparatus $108_A$ to a digital value for the controller 104 to use as a light level sample. The voltage on either side of the isolation resistor 306 (which may be 1 kΩ in one example) is relatively constant due to the very low current so the sampled voltage is effectively the voltage $V_1$ on node N1.

The ADC within the controller 104 can be set to detect a range of voltages by setting an input for a reference voltage $V_{ref}$ on the controller 104. In one embodiment, the controller 104 uses the same supply voltage $V_{DD}$ as the light detection apparatus $108_A$ which may be 3V and the reference voltage $V_{ref}$ is set at ~2.7V. This would provide a range of 0.3V (2.7V to 3V) for the ADC to detect voltages. In one example implementation, the ADC has a range of 1024 digital outputs depending linearly on the voltage that is converted. Therefore, with a range of 0.3V, the ADC would provide a unique digital output for each 0.29 mV change in the voltage. It should be understood that a different range of voltages could be utilized and/or a different level of digital outputs could be used. The smaller the range of voltages that is used and the larger number of digital outputs from the ADC, the more defined results that can be achieved for the voltage range of interest. For example, if it is known that the voltage $V_1$ will range between $-0.999 \times V_{DD}$ to $-0.990 \times V_{DD}$ and $V_{DD}$ is 3V, then a $V_{ref}$ of 2.95V could be utilized to provide a smaller range of voltages and to detect a more subtle change in voltage. One skilled in the art would understand that there are a large number of manners to implement a similar ADC.

FIG. 3B illustrates a modified light detection apparatus $108_B$ which is similar to the light detection apparatus $108_A$ of FIG. 3A with like components having the same reference number. As shown, the light detection apparatus $108_B$ further comprises an external ADC 308. In this implementation, the controller 104 is not required to have an ADC and the output of the ADC 308 is a digital input to the controller 104. The function of the light detection apparatus $108_B$ is otherwise identical to that of the light detection apparatus $108_A$ of FIG. 3A.

FIG. 3C illustrates a further modified light detection apparatus $108_C$ which is similar to the light detection apparatus $108_A$ of FIG. 3A with like components having the same reference number. As shown, the light detection apparatus $108_C$ comprises a phototransistor 312 coupled between the supply voltage VDD and the node N1 while a resistor 314 with a value of R3 is coupled between a reference ground and the node N1. The voltage $V_1$ at node N1 is determined based on the voltage divider between resistor 314 and the resistance of the phototransistor 312: $V_1 = R3/(R3+R_{CE}) \times V_{DD}$.

In some embodiments of the present invention, the resistance R3 is selected to be small (ex. 50Ω in one example) in order to ensure a relatively fast response (for example ~10 µs) when the phototransistor 312 senses a change in light level. With a small value for resistance R3, the voltage $V_1$ is very close to the reference ground and adjusts only slightly based upon the change of resistance across the phototransistor 312 as light is sensed. For example, in one implementation, the voltage $V_1$ may range from ~0.001V to ~0.010V. In the embodiment of FIG. 3C, the controller 104 comprises an ADC similar to the controller 104 of FIG. 3A. In this case, the ADC within the controller 104 can be set to detect a range of voltages by setting an input for a reference voltage $V_{ref}$ on the controller 104. In one embodiment, the controller 104 uses the same reference ground as the light detection apparatus $108_C$ and the reference voltage $V_{ref}$ is set at ~0.3V. This would provide a range of 0.3V (0V to 0.3V) for the ADC to detect voltages. It should be understood that modifications or changes could also be implemented similar to the light detection apparatus $108_A$ and controller 104 of FIG. 3A.

FIG. 3D illustrates a modified light detection apparatus $108_D$ which is similar to the light detection apparatus $108_C$ of FIG. 3C with like components having the same reference number. As shown, the light detection apparatus $108_D$ further comprises the external ADC 308 similar to that depicted in FIG. 3B. In this implementation, the controller 104 is not required to have an ADC and the output of the ADC 308 is a digital input to the controller 104. The function of the light detection apparatus $108_D$ is otherwise identical to that of the light detection apparatus $108_C$ of FIG. 3C.

FIGS. 4A, 4B, 4C and 4D are circuit diagrams of the light detection apparatus 108 according to alternative embodiments of the present invention in which a photodiode 402 is utilized. Each of FIGS. 4A, 4B, 4C and 4D illustrate a different implementation of a light detection apparatus $108_E$, $108_F$, $108_G$, $108_H$ respectively which are similar to the light detection apparatus $108_A$, $108_B$, $108_C$, $108_D$ respectively of FIGS. 3A, 3B, 3C, 3D with like components having the same reference number. Each of the light detection apparatus $108_E$, $108_F$, $108_G$, $108_H$ comprise a photodiode 402 in place of the phototransistor 302 of FIGS. 3A, 3B, 3C, 3D. The current flow through the photodiode 402 is linearly proportional to the light level that is sensed at the photodiode 402. If no light is sensed at the photodiode 402, no current flows through the photodiode 402. For the implementations of FIGS. 4A and 4B, no light would result in the voltage $V_1$ at the node N1 to be close to the supply voltage $V_{DD}$. For the implementations of FIGS. 4C and 4D, no light would result in the voltage $V_1$ at the node N1 to be close to the reference ground. Current flowing through the photodiode 402 increases as light is sensed at the photodiode 402. For the implementation of FIGS. 4A and 4B, this increased light would result in the voltage $V_1$ at the node N1 to decrease from the supply voltage $V_{DD}$. For the implementation of FIGS. 4C and 4D, this increased light would result in the voltage $V_1$ at the node N1 to increase from the reference ground. In specific implementations, the photodiode 402 is reverse biased to force it into photo conductive mode in order to allow for fast response times when light levels change, though photo conductive mode also increases the noise level. An ADC within the controller 104 of FIGS. 4A and 4C and the ADC 308 of FIGS. 4B and 4D can operate similar to as described with reference to FIGS. 3A, 3B, 3C, 3D and convert the voltage $V_1$ to a digital value that the controller 104 can use as a sampled light level.

FIGS. 5A, 5B, 5C and 5D are circuit diagrams of a light detection apparatus according to embodiments of the present invention in which a photoresistor 502 is utilized. Each of FIGS. 5A, 5B, 5C and 5D illustrate a different implementation of a light detection apparatus $108_I$, $108_J$, $108_K$, $108_L$ respectively which are similar to the light detection apparatus $108_A$, $108_B$, $108_C$, $108_D$ respectively of FIGS. 3A, 3B, 3C, 3D with like components having the same reference number. Each of the light detection apparatus $108_I$, $108_J$, $108_K$, $108_L$ comprise a photoresistor 502 in place of the phototransistor 302 of FIGS. 3A, 3B, 3C, 3D. The resistance of the photoresistor 502 is relative to the light level that is sensed at the photoresistor 502. If no light is sensed at the photoresistor 502, the photoresistor 502 has a very high resistance. For the implementations of FIGS. 5A and 5B, no light would result in the voltage $V_1$ at the node N1 to be close to the supply voltage $V_{DD}$. For the implementations of FIGS. 5C and 5D, no light would result in the voltage $V_1$ at the node N1 to be close to the reference ground. Resistance of the photoresistor 502 decreases as light is sensed at the photoresistor 502. For the implementation of FIGS. 5A and 5B, this increased light would result in the voltage $V_1$ at the node N1 to decrease from the supply voltage $V_{DD}$. For the implementation of FIGS. 5C and 5D, this increased light would result in the voltage $V_1$ at the node N1 to increase from the reference ground. An ADC within the controller 104 of FIGS. 5A and 5C and the ADC 308 of FIGS. 5B and 5D can operate similar to as described with reference to FIGS. 3A, 3B, 3C, 3D and convert the voltage $V_1$ to a digital value that the controller 104 can use as a sampled light level. The photoresistor 502 has a relatively slow response time to light level changes compared to the phototransistor 302 of FIGS. 3A, 3B, 3C, 3D and the photodiode 402 in photo conductive mode of FIGS. 4A, 4B, 4C, 4D. This slow response time may make a photoresistor 502 unworkable in some implementations, such as embodiments in which light levels are sampled during time periods of a fast duty cycle in which LEDs are activated and deactivated such that the changes are not perceptible to the human eye.

Figure 6A:
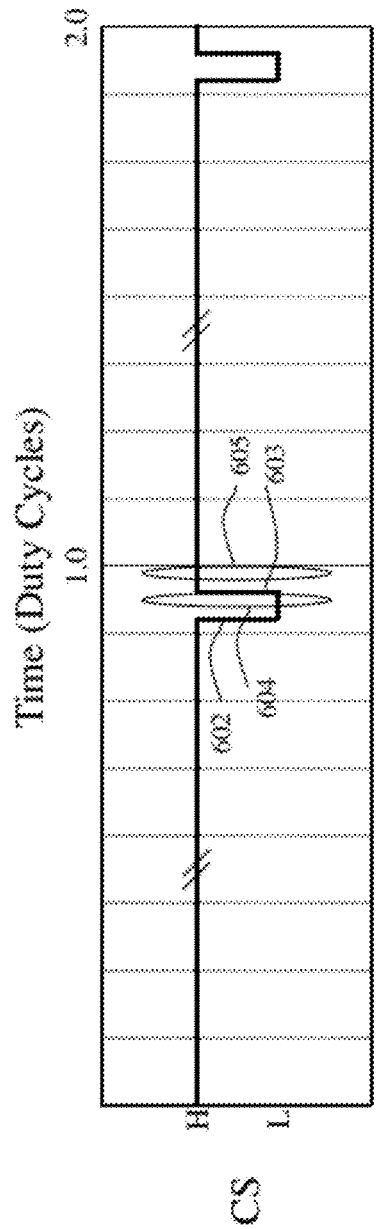
FIGS. 6A, 6B, 6C and 6D are example signal diagrams for control signals that may control a light engine of FIG. 1.
Figure 6B:
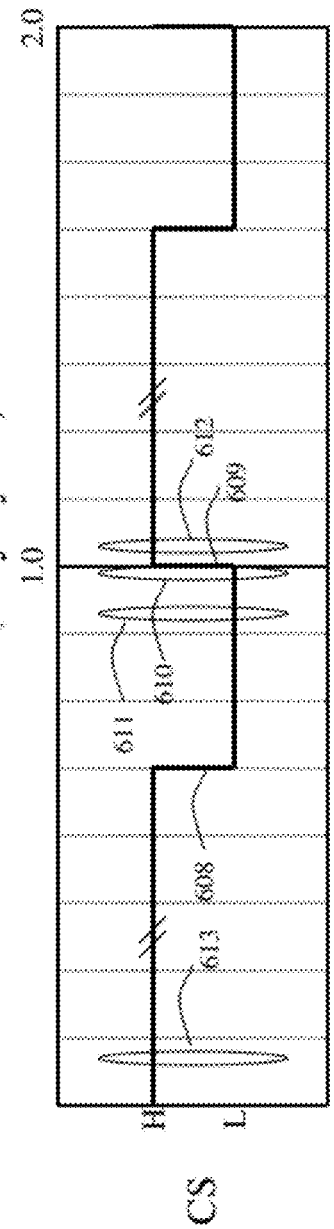
Figure 6C:
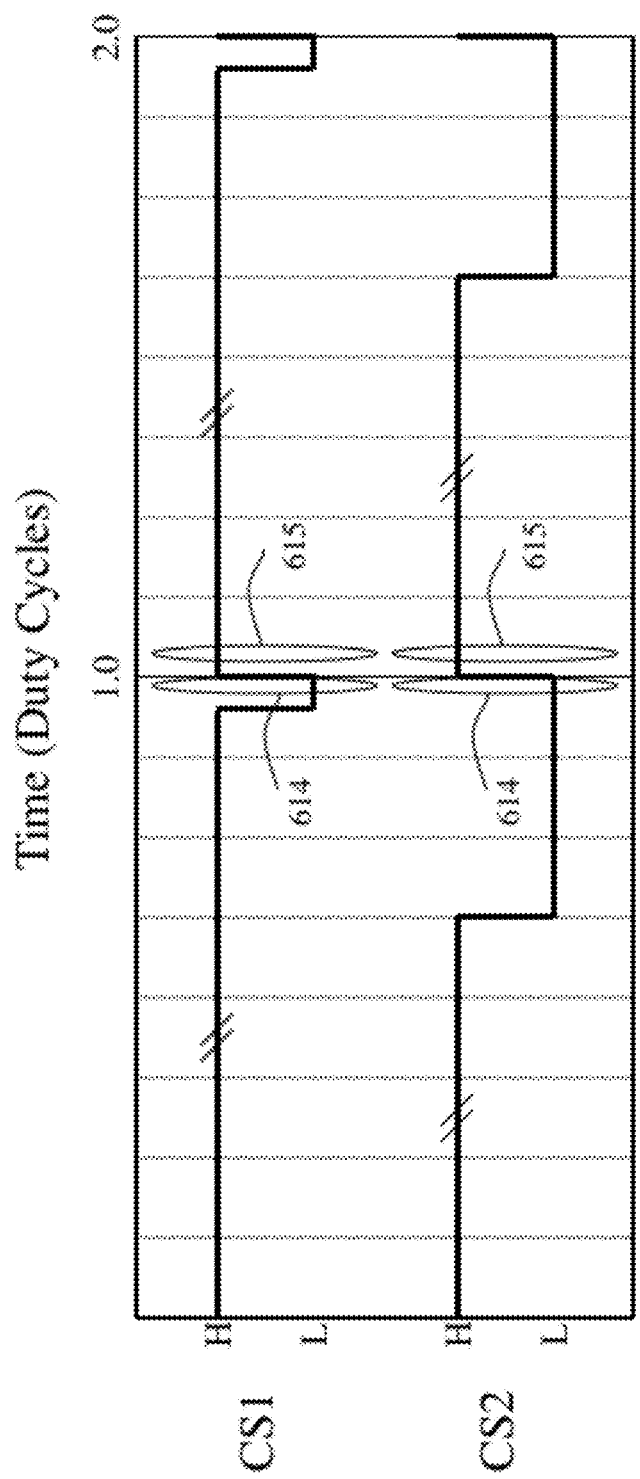
Figure 6D:
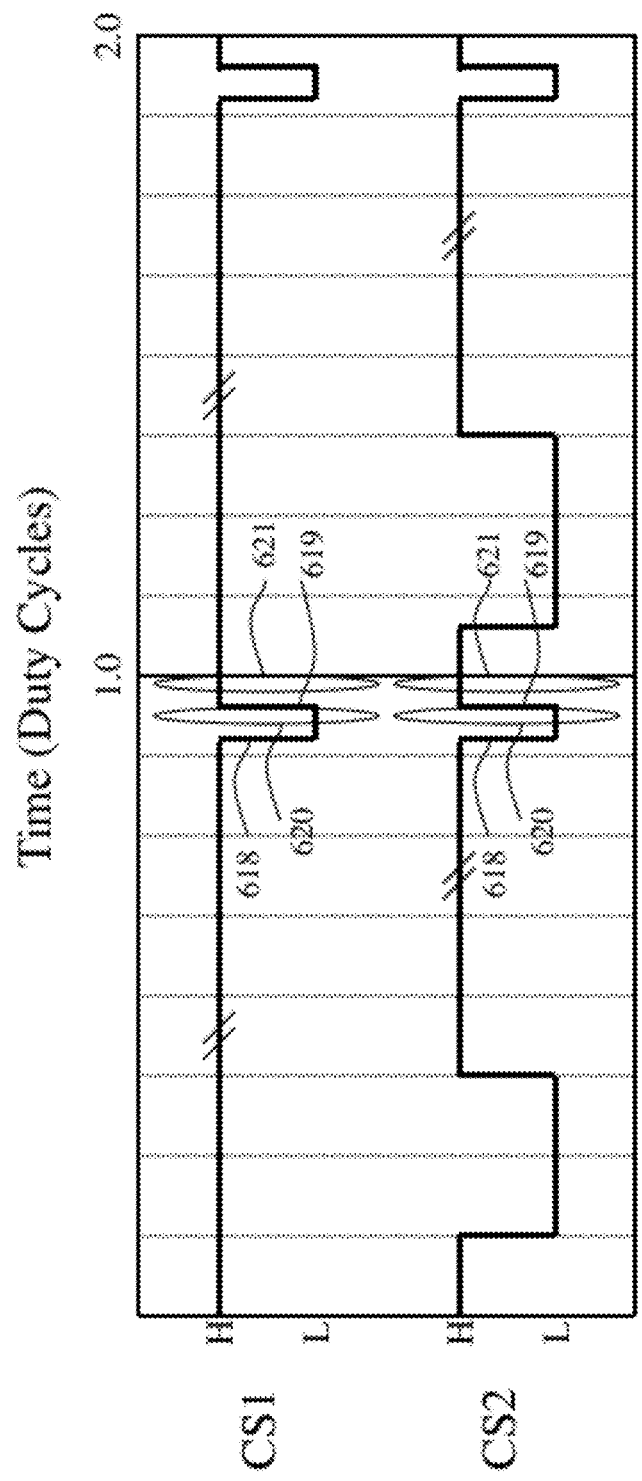

In some embodiments of the present invention, the controller 104 controls the activation and deactivation of the light engine 102 within a duty cycle using a PWM control signal. FIGS. 6A, 6B, 6C and 6D are example signal diagrams for control signals that may control the light engine 102. In the examples of FIGS. 6A and 6B, the control signal (CS) is activating and deactivating all of the LEDs on the light engine 102 with a single CS. In the examples of FIGS. 6C and 6D, there are two control signals, CS1 and CS2 which each control at least a portion of the LEDs in the light engine 102. In the depicted embodiments, the controller 104 is controlling the light engine 102 to ensure that the controller 104 may conduct a sample of light output with the LEDs in the light engine 102 deactivated and conduct a sample light output with the LEDs in the light engine 102 activated.

In one implementation in which there are 256 slots within a duty cycle, each slot comprising ~10 μs duration, the controller 104 includes additional slots of similar duration allocated to perform the two samples of the light levels described herein. During one or more of the additional slots, the controller 104 forces all LEDs within the light engine 102 to be deactivated (the "off" state), so that the ambient light only is detected when the controller 104 samples the first light level using the light detection apparatus 108. In a further one or more additional slots, the controller 104 forces all, or a portion of all, of the LEDs within the light engine 102 to be activated (the "on" state), so that both ambient light and light reflected by an object local to the lighting apparatus 100 are detected when the controller 104 samples the second light level at the light detection apparatus 108.

In this particular implementation, if the sampling function is continuous across all duty cycles and the controller 104 only forces the LEDs to be activated for a single slot each duty cycle, the light from the light engine 102 will not be able to dim to zero, but rather to approximately 1/258 of the maximum light at 100% duty cycle. In some embodiments, it is not necessary for the controller 104 to conduct the sampling every duty cycle and instead the sampling of the light outputs is conducted by the controller 104 as limited as possible without causing flicker to be perceptible to the human eye. In this case, the sampling by the controller 104 (and hence the forced activation of the LEDs for at least one slot) may be done every set number of duty cycles. For example, if the duty cycle is 2560 μs in length, then the controller 104 may only conduct the sampling of the light outputs every 16 duty cycles, which would lead to the LEDs being forced activated for only a single slot every ~50 ms if the light engine 102 is dimmed to the lowest light level. In this case, the darkest the light engine 102 may be dimmed and yet have the controller 104 conduct continuous, flicker-free sampling of the light outputs as described, is approximately 1/4128 of the maximum intensity, which is relatively negligible in most applications.

FIG. 6A depicts an example signal diagram for control signal CS that may control the light engine 102. In this example, the light engine 102 is to be set to 100% intensity over a 256 slot duty cycle followed by a forced deactivation 602 and a forced activation 603 to allow the controller 104 to conduct sampling of light levels with the light engine 102 deactivated and activated. As shown, the control signal CS is at a high level for all of the slots (256 in this case) of the duty cycle up to a forced deactivation 602 of two slots followed by a forced activation 603 of two slots. In other implementations, the forced deactivation 602 and/or forced activation 603 may be shorter or longer than two slots, depending upon design. In the implementation of FIG. 6A, the controller conducts a first sample of the light level 604 when the light engine 102 is deactivated and a second sample of the light level 605 when the light engine 102 is activated. In this case, the first sample 604 is conducted after the light engine 102 has been forced deactivated for one time slot and the second sampling 605 is conducted after the light engine 102 has been forced activated for one time slot to ensure the light level is consistent over the sample periods (ex. ~10 μs). One benefit of adding a forced deactivation and a forced activation at the end of a duty cycle is that the sampling of light levels becomes independent of the normal control of the light engine 102 for such functions as dimming, color control and/or color temperature control.

In an alternative implementation, the controller 104 can conduct the sampling of light levels during periods within the duty cycle in which the light engine 102 would already be deactivated and activated due to normal control of the light engine 102 for such functions as dimming, color control and/or color temperature control. In this case, the controller 104 conducts the samples at times that coincide with the deactivation and activation of the LEDs within the light engine 102. FIG. 6B depicts a signal diagram for control signal CS that may control the light engine 102. In this case, for dimming purposes, the control signal CS is high and therefore the light engine is activated for a set number of slots up to time 608 and then low and therefore the light engine is deactivated for a set number of slots up to time 609, which in this case is the end of the duty cycle. The controller 104 may conduct the sample of the first light level when the light engine 102 is deactivated during any slot after time 608 in which the light engine 102 is deactivated and may conduct the sample of the second light level when the light engine 102 is activated during any slot prior to time 608 or after the next duty cycle begins at time 609. Shown in FIG. 6B, the controller 104 may conduct the sample of the first light level at the end of the duty cycle (shown as sample 610) or may conduct the sample of the first light level at another time during which the light engine 102 is deactivated (shown as sample 611).

Further, the controller 104 may conduct the sample of the second light level at the beginning of the next duty cycle (shown as sample 612) or may conduct the sample of the second light level at another time during which the light engine 102 is activated during the duty cycle (shown as sample 613).

In some embodiments, the light engine 102 may comprise a plurality of sets of LEDs that are independently controlled by a plurality of control signals. In these cases, the controller 104 may conduct the sample of the light levels while coordinating with both of the control signals to ensure all of the LEDs within the light engine 102 are deactivated during the sample of the first light level and all, or at least a portion of, the LEDs within the light engine 102 are activated during the sample of the second light level. FIG. 6C depicts a signal diagram for first and second control signals CS1, CS2 with which the controller 104 has coordinated samples of the first and second light levels. As shown, the first control signal CS1 is at a high state for all but the final two slots of the duty cycle (an intensity of 99.2% if the duty cycle has 256 slots) while the second control signal is at a high state for all but the final twelve slots of the duty cycle (an intensity of 95.3%). In this example, the controller 104 conducts a sample of the first light level 614 in the final slot of the duty cycle during which both the first and second control signals CS1, CS2 have deactivated (turned "off") their respective portion of the light engine 102. The controller 104 conducts a sample of the second light level 615 in the second slot of the following duty cycle during which both the first and second control signals CS1, CS2 have activated (turned "on") their respective portion of the light engine 102.

FIG. 6D depicts a signal diagram for first and second control signals CS1, CS2 with which the controller 104 has added a forced deactivation 618 and a forced activation 619 at the end of the duty cycle. In this example, both the first and second control signals CS1, CS2 control their respective portions of the LEDs within the light engine 102 as normal and have additional time slots (ex. four slots in FIG. 6D) added at the end of the normal duty cycle (ex. 256 slots in one implementation). In this example, the controller 104 conducts a sample of the first light level 620 during the second slot of the forced deactivation 618 and conducts a sample of the second light level 621 during the second slot of the forced activation 619 similar to the implementation of FIG. 6A.

Although FIGS. 6C and 6D illustrate implementations in which the first and second control signals CS1, CS2 are coordinated to allow a full deactivation and full activation of the LEDs within the light engine 102, it should be understood that in other embodiments all of the portions of the LEDs within the light engine 102 may not be deactivated and activated during the samples of the first and second light levels respectively. As described previously, the light engine 102 may radiate light at a first luminosity during the sample of the first light level and may radiate light at a second luminosity, greater than the first luminosity, during the sample of the second light level.

Various implementations of the present invention described herein have varying advantages. For instance, the very limited time (as little as 20 µs in some embodiments) for the controller 104 to conduct the samples of the first and second light levels during some embodiments allows for the determination of whether an object local to the lighting apparatus has caused light from the light radiating devices to reflect back to the light detection apparatus to be conducted continuously and without causing flicker that is perceptible to the human eye. Further, the changes in ambient light levels over a day or the turning on/off of a light source within a room should not affect the determination of whether an object local to the lighting apparatus has caused light from the light radiating devices to reflect back to the light detection apparatus. Only if the light source was turned on or off within the very limited time during which the controller 104 conducts the samples of the first and second light levels, could a problem in the determination occur. The probability of such an occurrence can be reduced to ~1/4000 in the example implementation in which the controller 104 conducts the samples of the first and second light levels during a single forced deactivation slot and a single forced deactivation slot every $16^{th}$ duty cycle (each duty cycle being 256 slots). In some embodiments, upon determining that an object local to the lighting apparatus has caused light from the light radiating devices to reflect back to the light detection apparatus, the controller 104 may conduct further samples of the first and second light outputs in order to verify this determination. In this case, the probability of error due to an external light source turning on/off can be reduced to ~1/2,000,000.

Although various embodiments of the present invention have been described and illustrated, it will be apparent to those skilled in the art that numerous modifications and variations can be made without departing from the scope of the invention, which is defined in the appended claims.

What is claimed is:

1. A lighting apparatus comprising:
   one or more light radiating devices operable to be activated and deactivated;
   a light detection apparatus optically isolated from the light radiating devices and operable to sense light levels local to the lighting apparatus; and
   a control apparatus operable to sample a first light level using the light detection apparatus at a first time during which the light radiating devices are deactivated; to sample a second light level using the light detection apparatus at a second time during which the light radiating devices are activated; to determine whether an object local to the lighting apparatus has caused light from the light radiating devices to reflect back to the light detection apparatus using the first and second light levels; and to control an aspect of the light radiating devices in response to determining that an object local to the lighting apparatus has caused light to reflect back to the light detection apparatus.

2. A lighting apparatus according to claim 1, wherein to control an aspect of the light radiating devices, the control apparatus is operable to change the aspect in a predetermined manner; wherein the control apparatus is operable to continuously determine whether an object local to the lighting apparatus has caused light to reflect back to the light detection apparatus; and, if the control apparatus continues to determine that an object local to the lighting apparatus has caused light to reflect back to the light detection apparatus, the control apparatus is operable to continue to change the aspect in the predetermined manner.

3. A lighting apparatus according to claim 1, wherein the aspect of the light radiating devices comprises the luminous intensity of the light radiating devices.

4. A lighting apparatus according to claim 1, wherein the light radiating device comprise a plurality of light radiating devices of different colors; and wherein the aspect of the light radiating devices comprises a combined color of the light radiating devices.

5. A lighting apparatus according to claim 1, wherein the light radiating device comprise a plurality of white light radiating devices of different color temperatures; and wherein the aspect of the light radiating devices comprises a combined white color temperature of the light radiating devices.

6. A lighting apparatus according to claim 1, wherein the light radiating devices comprise one or more light emitting diodes.

7. A lighting apparatus according to claim 6, wherein the control apparatus is operable to control the activation and deactivation of the light emitting diodes.

8. A lighting apparatus according to claim 7, wherein the control apparatus is operable to control the activation and deactivation of the light emitting diodes using pulse width modulation signals within a duty cycle.

9. A lighting apparatus according to claim 8, wherein the one or more light emitting diodes comprises a plurality of light emitting diodes; and wherein the first time is during a time period within the duty cycle in which substantially all of the plurality of light emitting diodes are deactivated and the second time is during a time period within the duty cycle in which substantially all of the plurality of light emitting diodes are activated.

10. A lighting apparatus according to claim 8, wherein the one or more light emitting diodes comprises a plurality of light emitting diodes; and wherein the first time is during a time period within the duty cycle in which fewer of the plurality of light emitting diodes are activated than compared to a time period in which the second time occurs.

11. A lighting apparatus according to claim 8, wherein the control apparatus is further operable to sample a third light output using the light detection apparatus at a third time during which the light radiating devices are deactivated; to sample a fourth light level using the light detection apparatus at a fourth time during which the light radiating devices are activated; and determine whether an object local to the lighting apparatus has caused light from the light radiating devices to reflect back to the light detection apparatus using the third and fourth light levels; and wherein the control apparatus is operable to sample the first light output and the second light output within a first duty cycle and to sample the third light output and the fourth light output within a second duty cycle.

12. A lighting apparatus according to claim 11, wherein the first duty cycle and the second duty cycle are separated in time by one or more duty cycles in which the control apparatus does not sample the light level using the light detection apparatus.

13. A lighting apparatus according to claim 1, wherein to determine whether an object local to the lighting apparatus has caused light from the light radiating devices to reflect back to the light detection apparatus, the control apparatus is operable to determine the difference between the first and second light outputs and determine if the difference is greater than a predetermined value.

14. A method implemented within a lighting apparatus comprising one or more light radiating devices operable to be activated and deactivated and a light detection apparatus optically isolated from the light radiating devices and operable to sense light levels local to the lighting apparatus; the method comprising:
  sampling a first light level using the light detection apparatus at a first time during which the light radiating devices are deactivated;
  sampling a second light level using the light detection apparatus at a second time during which the light radiating devices are activated;
  determining whether an object local to the lighting apparatus has caused light from the light radiating devices to reflect back to the light detection apparatus using the first and second light levels; and
  controlling an aspect of the light radiating devices in response to determining that an object local to the lighting apparatus has caused light to reflect back to the light detection apparatus.

15. A lighting apparatus comprising:
one or more light radiating devices;
a light detection apparatus optically isolated from the light radiating devices and operable to sense light levels local to the lighting apparatus; and
a control apparatus operable to sample a first light level using the light detection apparatus at a first time during which the light radiating devices are radiating light, wherein the light being radiated at the first time being at a first luminous intensity; to sample a second light level using the light detection apparatus at a second time during which the light radiating devices are radiating light, wherein the light being radiated at the second time being at a second luminous intensity, the second luminous intensity being different than the first luminous intensity; and determine whether an object local to the lighting apparatus has caused light from the light radiating devices to reflect back to the light detection apparatus using the first and second light levels.

16. A lighting apparatus according to claim 15, wherein the control apparatus is further operable to control an aspect of the light radiating devices in response to determining that an object local to the lighting apparatus has caused light to reflect back to the light detection apparatus.

17. A lighting apparatus according to claim 15, wherein the control apparatus is further operable to control an aspect of a controllable apparatus in response to determining that an object local to the lighting apparatus has caused light to reflect back to the light detection apparatus.

18. A lighting apparatus according to claim 17, wherein to control an aspect of the controllable apparatus, the control apparatus is operable to change the aspect in a predetermined manner; wherein the control apparatus is operable to continuously determine whether an object local to the lighting apparatus has caused light to reflect back to the light detection apparatus; and, if the control apparatus continues to determine that an object local to the lighting apparatus has caused light to reflect back to the light detection apparatus, the control apparatus is operable to continue to change the aspect in the predetermined manner.

19. A lighting apparatus according to claim 17, wherein the controllable apparatus comprises an audio radiating apparatus; and wherein the aspect of the controllable apparatus comprises at least one of an audio intensity, audio direction, audio equalization and audio balance of the audio radiating apparatus.

20. A lighting apparatus according to claim 17, wherein the controllable apparatus comprises an apparatus operable to provide content from at least one of a plurality of content channels; and wherein the aspect of the controllable apparatus comprises one of a selection of content channels and selection of content elements.

21. A lighting apparatus according to claim 17, wherein the controllable apparatus comprises an apparatus operable to dispense a material; and wherein the aspect of the controllable apparatus comprises a selection of one of the quantity of the material to be dispensed and the rate at which to dispense the material.

22. A lighting apparatus according to claim 17, wherein the controllable apparatus comprises an apparatus operable to set a temperature; and wherein the aspect of the controllable apparatus comprises a selection of the temperature.

23. A method implemented within a lighting apparatus comprising one or more light radiating devices and a light detection apparatus optically isolated from the light radiating devices and operable to sense light levels local to the lighting apparatus; the method comprising:
- sampling a first light level using the light detection apparatus at a first time during which the light radiating devices are radiating light, wherein the light being radiated at the first time being at a first luminous intensity;
- sampling a second light level using the light detection apparatus at a second time during which the light radiating devices are radiating light, wherein the light being radiated at the second time being at a second luminous intensity, the second luminous intensity being different than the first luminous intensity; and
- determining whether an object local to the lighting apparatus has caused light from the light radiating devices to reflect back to the light detection apparatus using the first and second light levels.

* * * * *